(12) United States Patent
Sawada et al.

(10) Patent No.: US 7,325,833 B2
(45) Date of Patent: Feb. 5, 2008

(54) STEERING DEVICE FOR MOTOR VEHICLE

(75) Inventors: Naoki Sawada, Gunma-ken (JP); Koji Inoue, Gunma-ken (JP)

(73) Assignee: NSK Ltd., Tokyo (JP)

( * ) Notice: Subject to any disclaimer, the term of this patent is extended or adjusted under 35 U.S.C. 154(b) by 235 days.

(21) Appl. No.: 10/534,260

(22) PCT Filed: Nov. 11, 2003

(86) PCT No.: PCT/JP03/14304

§ 371 (c)(1),
(2), (4) Date: May 10, 2005

(87) PCT Pub. No.: WO2004/043766

PCT Pub. Date: May 27, 2004

(65) Prior Publication Data

US 2006/0043720 A1     Mar. 2, 2006

(30) Foreign Application Priority Data

Nov. 11, 2002  (JP) .............................. 2002-327311

(51) Int. Cl.
*B62D 1/18* (2006.01)

(52) U.S. Cl. .................................................. 280/775

(58) Field of Classification Search ................ 280/775, 280/777; 74/493
See application file for complete search history.

(56) References Cited

U.S. PATENT DOCUMENTS 5,106,040 A    4/1992  Cafmeyer et al.

| | | | |
|---|---|---|---|
| 6,324,935 B1* | 12/2001 | Schoen et al. | 74/493 |
| 6,467,807 B2* | 10/2002 | Ikeda et al. | 280/775 |
| 7,134,692 B2* | 11/2006 | Yamamura | 280/777 |

FOREIGN PATENT DOCUMENTS

| DE | 197 37 035 A1 | 3/1999 |
|---|---|---|
| EP | 1 535 824 A1 | 6/2005 |
| EP | 1 550 598 A1 | 7/2005 |
| FR | 2 729 362 | 7/1996 |
| JP | UM 55-91371 | 12/1953 |
| JP | 57 037068 A | 3/1982 |
| JP | UM 63-30605 | 8/1988 |

(Continued)

*Primary Examiner*—Paul N. Dickson
*Assistant Examiner*—Robert A. Coker
(74) *Attorney, Agent, or Firm*—Miles & Stockbridge PC

(57) ABSTRACT

A steering apparatus for a vehicle has a steering column rotatably supporting a steering shaft, a first support member held between opposed flat plate portions of an upper bracket and supporting the steering column, a second support member held between opposed flat plate portions of a lower bracket and supporting the steering column, a first support mechanism for supporting the steering column on the upper bracket, and a second support mechanism for supporting the steering column on the lower bracket, wherein the steering column, the first support member and the second support member are integrally formed, the first support member is integrally formed with a first swelling portion having a pair of side portions that respectively press-abut on a pair of opposed flat plate portions of the upper bracket, and the second support member is integrally formed with a second swelling portion having a pair of side portions that respectively press-abut on a pair of opposed flat plate portions of the lower bracket.

7 Claims, 10 Drawing Sheets

FOREIGN PATENT DOCUMENTS

| | | |
|---|---|---|
| JP | UM 6-25076 | 4/1994 |
| JP | 08 256423 A | 10/1996 |
| JP | 8-276852 | 10/1996 |
| JP | 10-7003 | 1/1998 |
| JP | 2000-53001 | 2/2000 |
| JP | 2002-249052 | 9/2002 |
| JP | 2002-302046 A | 10/2002 |
| JP | 2003-118595 | 4/2003 |

* cited by examiner

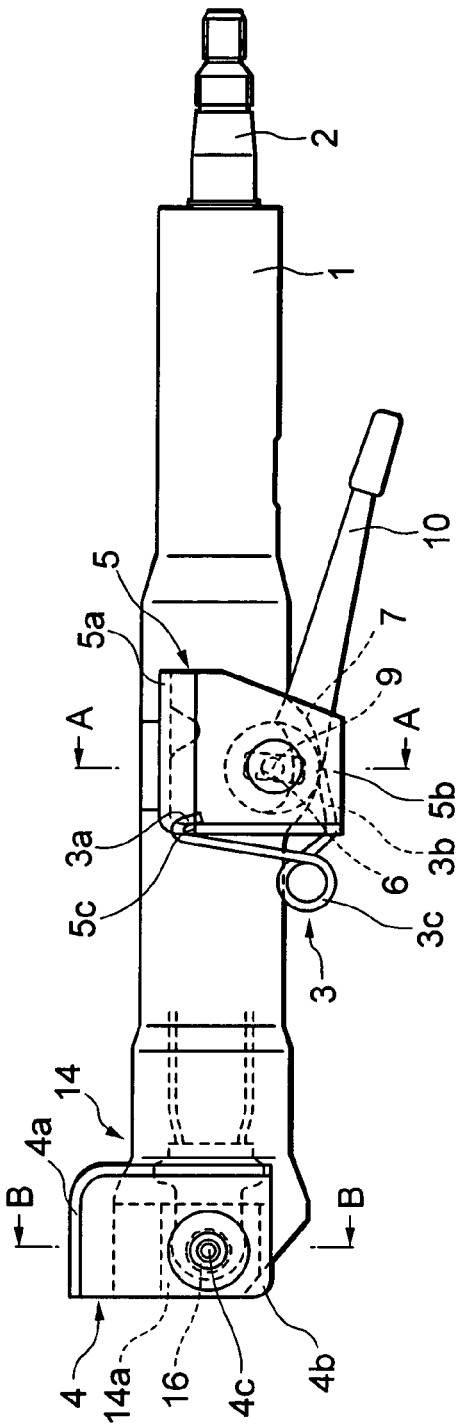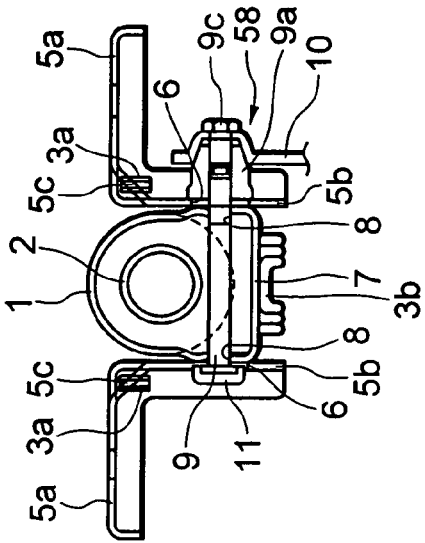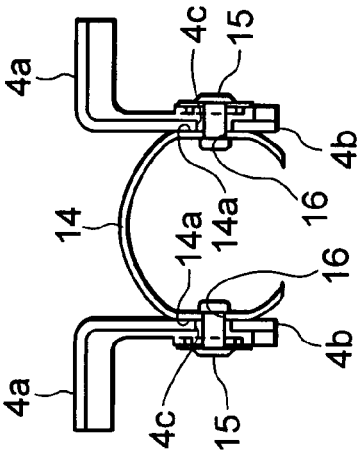
FIG. 1A
FIG. 1B
FIG. 1C

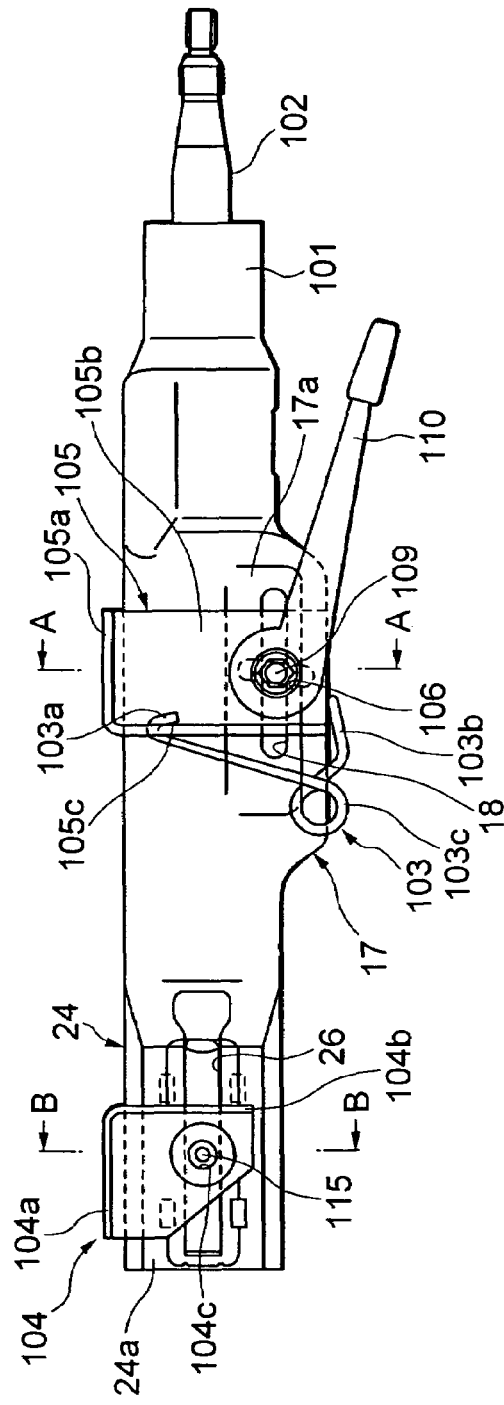
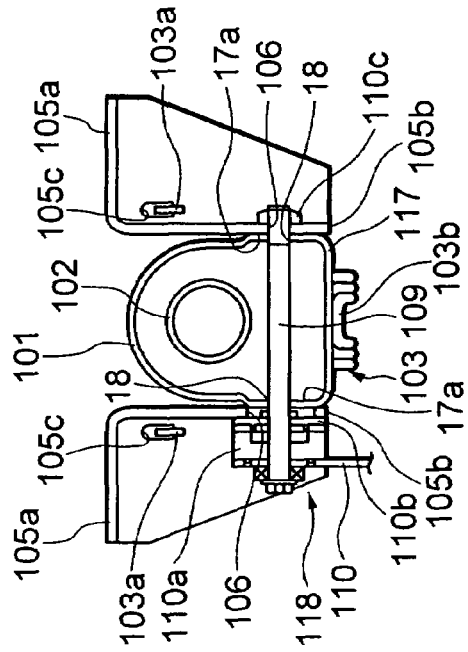
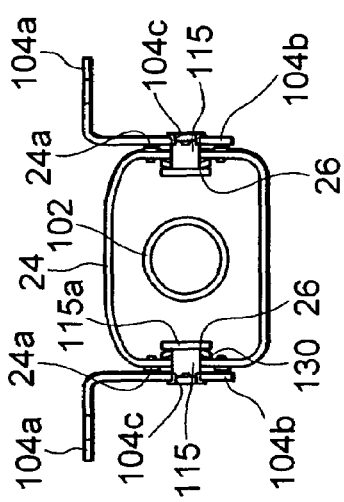
FIG. 3A
FIG. 3B
FIG. 3C

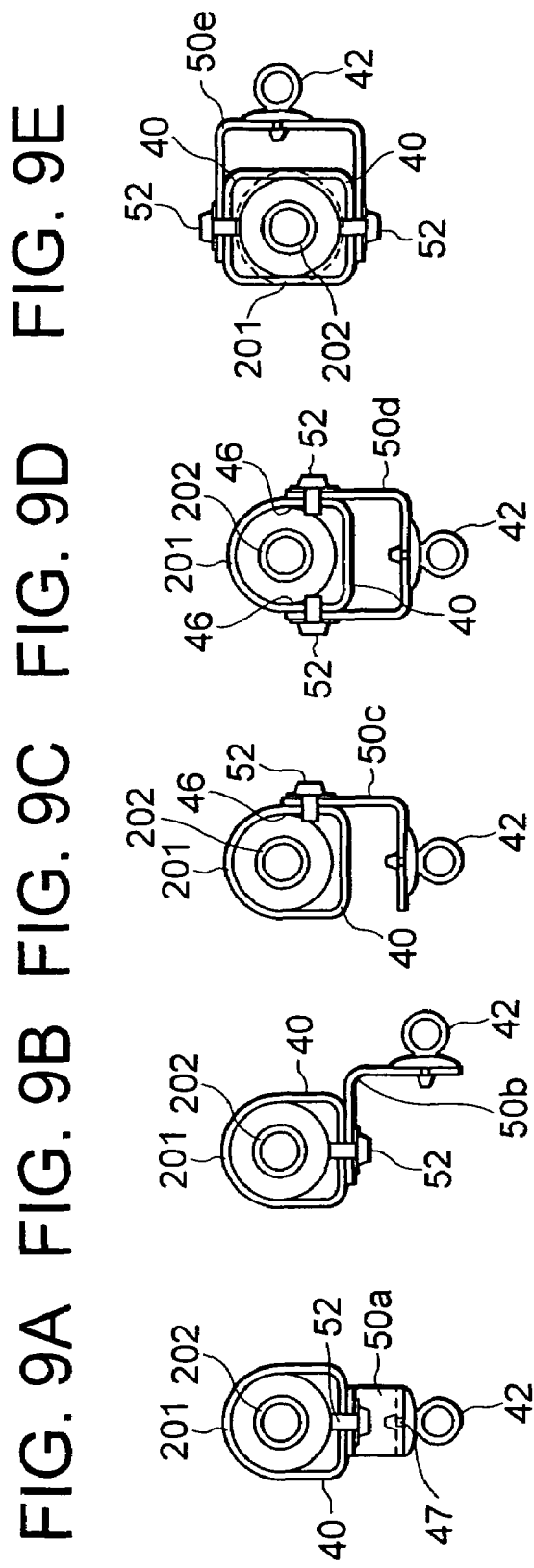

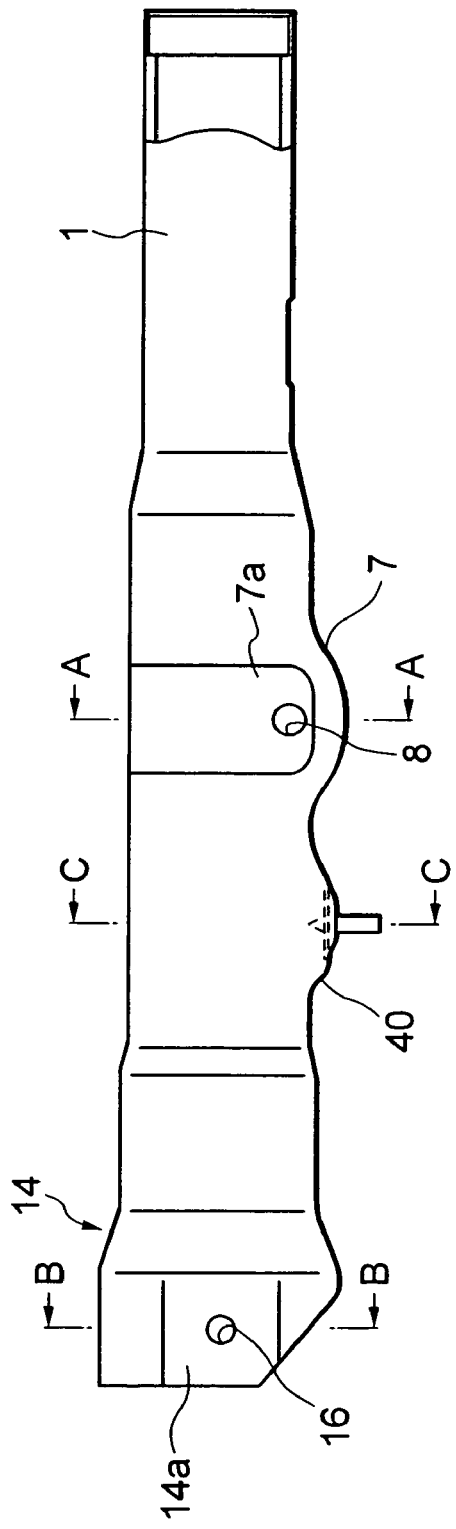
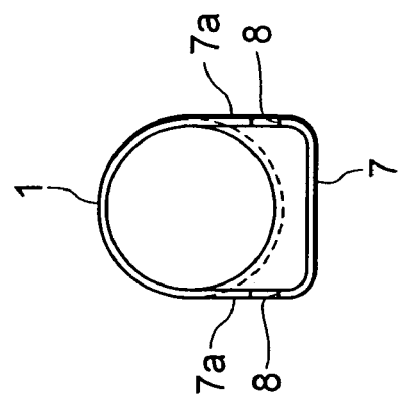
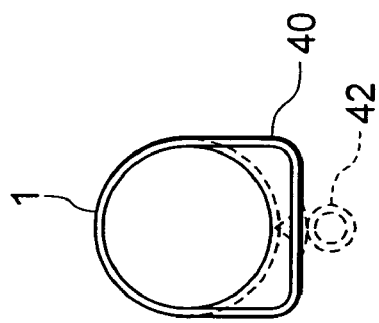
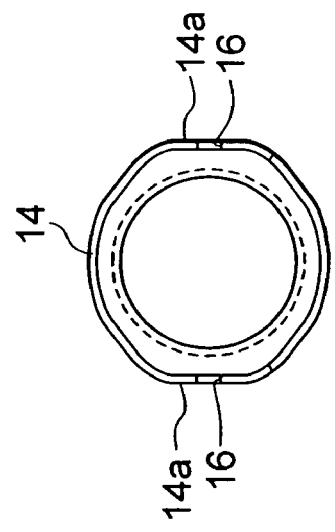

STEERING DEVICE FOR MOTOR VEHICLE

TECHNICAL FIELD

The present invention relates to a steering apparatus for a vehicle.

BACKGROUND ARTS

In the prior art, a steering column integrally formed with a swelling portion is molded of a steel pipe by plastic working, etc., and side faces of the swelling portion are formed with round holes or elongate holes for adjusting a column position, through which a fastening bolt of a clamp mechanism is inserted. With this configuration, the swelling portion having the column position adjusting round holes or elongate holes takes a closed sectional structure integral with the steering column. Accordingly, the steering column itself can be given high rigidity, and it is possible to reduce manufacturing costs (a material cost, a working cost and an assembling cost) and a weight as well (e.g., Japanese Patent Application Laid-Open Publication No. 8-276852 and Japanese Patent Application Laid-Open Publication No. 10-7003).

Note that the present applicant discloses, in preceding Japanese Patent Application No. 2001-238198, a hydroform process as a working method that a die assembly accommodates a thin-wall steel pipe, an interior of the steel pipe is filled with pressure water or oil, and the steel pipe is formed in a desired configuration by swelling the steel pipe. This method in the preceding application has advantages of enabling a compact design because of having no welding portion in the case of manufacturing a member taking a closed sectional structure by welding after press molding, exhibiting excellency of strength and rigidity, and reducing a working cost and a weight as well.

Further, in a telescopic type steering apparatus disclosed in Japanese Patent Application Laid-Open Publication No. 8-276852, a steering column is constructed such that, at a front side end thereof with respect to a vehicle body, a hinge bracket fixed to the column is secured by a hinge pin to a vehicle body side lower bracket, and at a middle portion of the steering column a distance bracket fixed to the column is secured to the vehicle body by a fastening bolt through a vehicle-body-side tilt bracket taking substantially an L-shape as viewed from a side. These bracket members (the hinge bracket and the distance bracket) fixed to the column are manufactured separately from the steering column and fixed to the steering column by welding, caulking, (or clinching) etc. when assembled.

Moreover, in a steering apparatus disclosed in Japanese Patent Application Laid-Open Publication No. 2000-53001 (FIG. 9), wires leading to switches of a winker, a wiper, a light, a horn, an ignition, etc. are bundled and thus accommodated in a harness in order to prevent a contact failure caused by vibrations, etc. when performing a tilt adjusting operation as well as a telescopic position adjusting operation and when traveling. This harness is fixed to the steering column via a harness fixing bracket by use of a clip, etc.

In the former case, however, the column position adjusting round or elongate hole formed in the swelling portion of the steering column is simply holed by a general type of working method, and a peripheral edge of this round or elongate hole is formed as an open end.

As a result, particularly in a telescopic structure requiring the elongate hole, a considerable degree of surface rigidity (flexural rigidity) of the periphery of the elongate hole at the swelling portion is not acquired, and a low level of the surface rigidity (flexural rigidity) of the swelling portion is a point that raises much concern.

Moreover, the peripheral edge of the elongate hole is the open end, and, because of the low surface rigidity (flexural rigidity) of the swelling portion, there is no alternative but to adopt a complicated machining method such as milling, etc. by way of a boring work method.

Still further, in the latter case, the hinge bracket, the distance bracket and the harness fixing bracket, which are fixed to the steering column, are manufactured separately from the steering column and welding, caulking (or clinching), etc. are adopted when assembled. Hence, there are increased the manufacturing costs (the material cost, the working cost and the assembling cost) and the weight of the steering column.

DISCLOSURE OF THE INVENTION

It is an object of the present invention, which was devised under such circumstances, to provide a steering apparatus for a vehicle that is capable of reducing the number of components by increasing rigidity of a steering column itself.

To accomplish the above object, a steering apparatus for a vehicle according to one aspect of the present invention comprises an upper bracket which is fixed to a rear side portion of a vehicle body and includes a pair of opposed flat plate portions formed with first holes opposed to each other and separated from each other, a lower bracket which is fixed to a front side portion of the vehicle body and includes a pair of opposed flat plate portions formed with second holes opposed each other and separated from each other, a steering column rotatably supporting a steering shaft, a first support member held between the opposed flat plate portions of the upper bracket, formed with a first support hole facing the first hole and supporting the steering column, a second support member held between the opposed flat plate portions of the lower bracket, formed with a second support hole facing the second hole and supporting the steering column, a first support mechanism for supporting the steering column on the upper bracket via the first hole of the upper bracket and via the first support hole of the first support member, and a second support mechanism for supporting the steering column on the lower bracket via the second hole of the lower bracket and via the second support hole of the second support member, wherein the steering column is integrally formed with the first support member and the second support member, the first support member is integrally formed with a first swelling portion having a pair of side portions that respectively press-abut on the pair of opposed flat plate portions of the upper bracket, and the second support member is integrally formed with a second swelling portion having a pair of side portions that respectively press-abut on the pair of opposed flat plate portions of the lower bracket.

Further, a steering apparatus for a vehicle according to another aspect of the present invention comprises an upper bracket fixed to a rear side portion of a vehicle body and including a pair of opposed flat plate portions formed with first holes opposed each other and separated from each other, a lower bracket fixed to a front side portion of the vehicle body and including a pair of opposed flat plate portions formed with second holes opposed each other and separated from each other, a steering column rotatably supporting a steering shaft, a first support member held between the opposed flat plate portions of the upper bracket, formed with a first support hole opposing the first hole and supporting the steering column, a second support member held between the opposed flat plate portions of the lower bracket, formed with a second support hole opposing the second hole and supporting the steering column, a third support member for supporting a harness member between the first support member and the second support member, a first support mechanism for supporting the steering column on the upper bracket via the first hole of the upper bracket and via the first support hole of the lower bracket, and a second support mechanism for supporting the steering column on the lower bracket via the second hole of the lower bracket and via the second support hole of the second support member, wherein the steering column is integrally formed with at least two support members among the first support member, the second support member and the third support member, the first support member is integrally formed with a first swelling portion having a pair of side portions that respectively press-abut on the pair of opposed flat plate portions of the upper bracket, the second support member is integrally formed with a swelling portion having a pair of side portions supported respectively via a hinge device on the pair of opposed flat plate portions of the lower bracket, and the third support member is integrally formed with a third swelling portion having a third support hole for fixing a support member that supports the harness member.

Still further, in the steering apparatus for the vehicle according to the present invention, it is preferable that the third support member is formed on the first swelling portion, formed extending toward a front side of a vehicle body, of the first support member.

Yet further, in the steering apparatus for the vehicle according to the present invention, it is preferable that a protruded portion protruding inward along the whole of the first support hole is formed along a peripheral edge of the first support hole.

Moreover, in the steering apparatus for the vehicle according to the present invention, it is preferable that the first hole of the upper bracket is an elongate hole for adjusting a tilt position, the second support mechanism is a hinge mechanism for rotatably supporting the steering column, and the first support mechanism holds and fixes the first support member between the pair of opposed flat plate portions of the upper bracket, or releases the first support member to enable the steering column to move.

Furthermore, in the steering apparatus for the vehicle according to the present invention, it is preferable that both of the first support hole of the first support member and the second support hole of the second support member are elongate holes for adjusting a telescopic position of the steering column.

A steering apparatus for a vehicle according to a further aspect of the present invention comprises a steering column for rotatably supporting a steering shaft, and a vehicle-body-rear-sided bracket and a vehicle-body-front-sided bracket, fixed to a vehicle-body-sided strengthening member, for supporting the steering column, wherein the steering column is integrally formed with a plurality of swelling portions and is supported on the vehicle-body-rear-sided bracket and/or the vehicle-body-front-sided bracket via the swelling portions.

BRIEF DESCRIPTION OF THE DRAWINGS

FIG. 1A is a side view of the whole of a tilt adjusting type steering column apparatus according to a first embodiment of the present invention; FIG. 1B is a sectional view taken along the line A-A in FIG. 1A, as well as being a sectional view of a steering column, of which a swelling portion takes an integral closed sectional structure, in the tilt adjusting type steering column apparatus for the vehicle according to the embodiment of the present invention; FIG. 1C is a sectional view taken along the line B-B in FIG. 1A, as well as being a sectional view of the steering column, of which a support bracket portion takes an integral closed sectional structure, in the tilt type steering column apparatus for the vehicle according to the embodiment of the present invention;

FIG. 3A is a side view showing the whole of a tilt/telescopic position adjusting type steering column apparatus for the vehicle according to a second embodiment of the present invention; FIG. 3B is a sectional view taken along the line A-A in FIG. 3A, as well as being a sectional view of a steering column, wherein a swelling portion of the tilt/telescopic adjusting type steering column apparatus for the vehicle according to the embodiment of the present invention takes an integral closed sectional structure; FIG. 3C is a sectional view taken along the line B-B in FIG. 3A, as well as being a sectional view of the steering column, wherein a support bracket portion of the tilt/telescopic adjusting type steering column apparatus for the vehicle according to the embodiment of the present invention takes an integral closed sectional structure;

FIG. 9A is a sectional view taken along the line C-C in FIG. 8, as well as being a sectional view of a steering column, wherein a swelling portion of the tilt adjusting type steering column apparatus for the vehicle according to the embodiment of the present invention takes an integral closed sectional structure; FIGS. 9B-9E are sectional views of a steering column, wherein a swelling portion of the tilt adjusting type steering column apparatus for the vehicle with a harness fixed by use of pieces of metal fittings taking a variety of configurations, takes an integral closed sectional structure; and FIG. 10A shows a side view of a tilt adjusting type steering column apparatus for a vehicle according to a sixth embodiment of the present invention; FIG. 10B is a sectional view taken along the line A-A in FIG. 10A, as well as being a sectional view of a steering column, wherein a swelling portion of the tilt adjusting type steering column apparatus for the vehicle according to the embodiment of the present invention takes an integral closed sectional structure; FIG. 10C is a sectional view taken along the line B-B in FIG. 10A, as well as being a sectional view of a support bracket portion of the tilt adjusting type steering column apparatus for the vehicle according to the embodiment of the present invention; FIG. 10D is a sectional views taken along the line C-C in FIG. 10A, as well as being a sectional view of a steering column, wherein a harness fixation swelling portion of the tilt type steering column apparatus for the vehicle according to the embodiment of the present invention takes an integral closed sectional structure.

EMBODIMENTS OF THE INVENTION

A steering apparatus for a vehicle according to each embodiment of the present invention will hereinafter be described with reference to the drawings.

First Embodiment

Figure 2A:
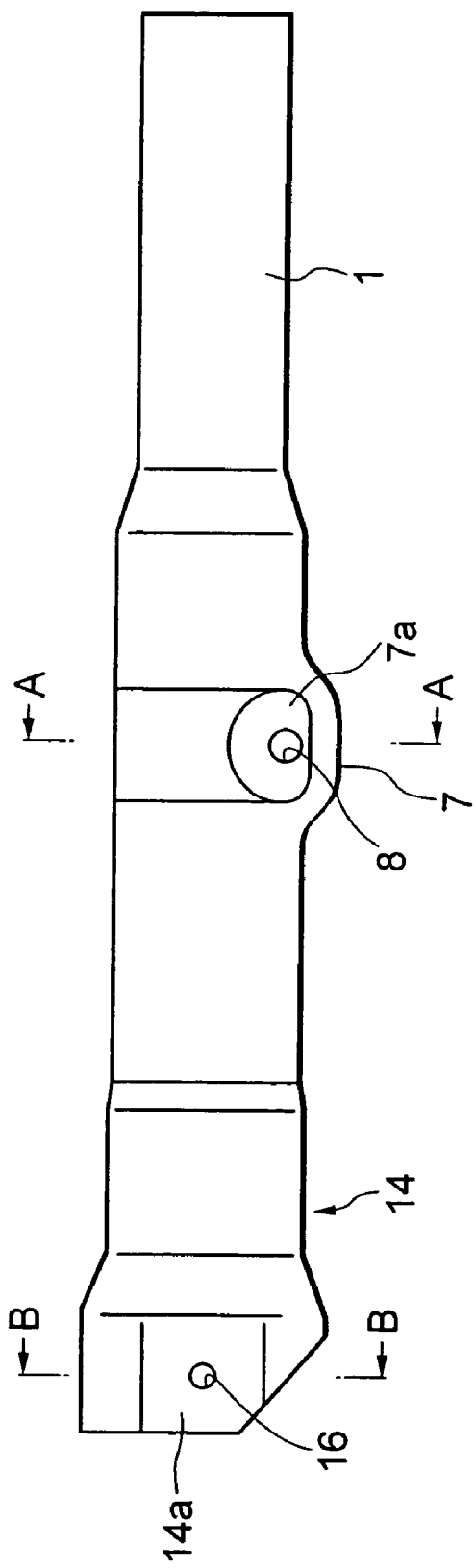
FIGS. 2A, 2B and 2C are views each showing a structure of only the steering column in FIGS. 1A, 1B, and 1C.
Figure 2B:
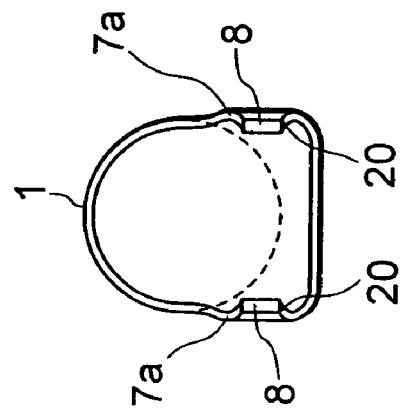
Figure 2C:
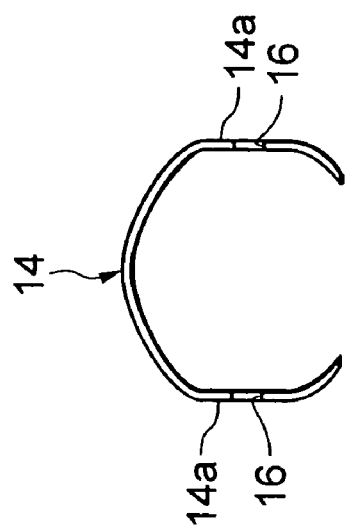

FIG. 1A is a side view of the whole of a tilt type steering column apparatus according to a first embodiment of the present invention. FIG. 1B is a sectional view taken along the line A-A in FIG. 1A, as well as being a sectional view of a steering column, of which a swelling portion takes an integral closed sectional structure, in the tilt type steering column apparatus for the vehicle according to the embodiment of the present invention. FIG. 1C is a sectional view taken along the line B-B in FIG. 1A, as well as being a sectional view of the steering column, of which a support bracket portion takes an integral closed sectional structure, in the tilt type steering column apparatus for the vehicle according to the embodiment of the present invention. FIGS. 2A, 2B and 2C are views each showing a structure of only a steering column 1 in FIGS. 1A, 1B, and 1C.

Referring to FIGS. 1A through 1C and FIGS. 2A through 2C, the tilt type steering apparatus for the vehicle according to the first embodiment of the present invention includes a tilt adjustable steering column (which will hereinafter be simply termed a steering column) 1 for the vehicle, wherein a steering shaft 2 is rotatably supported within the steering column 1 through a bearing (unillustrated) provided along an inner peripheral portion of the steering column 1, and an unillustrated steering wheel is secured to an upper side end portion, on the rear side of the vehicle body, of the steering shaft 2. In the first embodiment, the steering column 1 is made of a steel pipe material as a single piece of blank by integral molding based on a hydroform process which will be explained later on in a way that integrally forms a swelling portion 7 at a middle portion of the steering column 1 and a support bracket portion 14 at a lower side end portion, on the front side of the vehicle body, of the steering column 1.

To a central portion of the steering column 1 in a lengthwise direction a resilient member 3 taking substantially an L-shape as viewed in FIG. 1A, is fitted, thereby preventing the steering wheel from dropping down when releasing an operation lever 10. A tilt bracket 5 secured to the vehicle body, which is defined as an upper bracket, is fixed to an upper side portion on the rear side of the vehicle body.

The tilt bracket 5 includes a pair of horizontal portions 5a, 5a extending in a transversal direction of the steering column 1 and a pair of opposed flat plate portions 5b, 5b formed integrally with the pair of horizontal portions 5a, 5a, extending in up-and-down directions, and also extending in an axial direction on both sides of the steering column 1. The pair of opposed flat plate portions 5b, 5b are formed with a pair of tilt adjusting elongate holes (first bracket holes) 6, 6. The resilient member 3 taking substantially the L-shape is held by hooking hook portions 3a, 3a of the resilient member 3 on hooking portion 5c, 5c of the tilt bracket 5 secured to the vehicle body. A lower portion 3b of the resilient member 3 abuts on a lower portion of the swelling portion 7 of the steering column 1. The resilient member 3 is provided with ring portions 3c, 3c given a spring characteristic for sustaining the steering column 1 upward with these ring portions 3c, 3c.

A pair of flat side portions 7a, 7a, which are so supported by the vehicle-body-secured tilt bracket 5 as to come into contact with the respective opposed flat plate portions 5b, 5b of the vehicle-body-secured tilt bracket 5, are integrally formed on the swelling portion (a first support portion) 7 formed integrally with the steering column 1. These flat side portions 7a, 7a are formed with a pair of column support holes 8, 8 serving as first support holes. A fastening bolt 9 is, as a rectangular enlarged head portion 11 at the left end as viewed in FIG. 1B engages with a leftward tilt adjusting elongate hole 6, therefore unable to rotate. A tapered nut 9a is screwed to the other side end of the fastening bolt 9 outwardly of the right-side flat plate portion 5b, and the operation lever 10 is integrally fitted on the tapered nut 9a between this tapered nut 9a and the nut 9c fixed to an end of the fastening bolt 9, thus structuring a clamp mechanism 58. This clamp mechanism 58 adjusts a degree of fastening the opposed flat plate portions 5b, 5b via the bolt 9 through a rotation of the nut 9a by the operation lever 10, and is a known mechanism as such. The clamp mechanism 58 may also be a mechanism including a cam mechanism.

The lower side end portion, on the front side of the vehicle body, of the steering column is so supported on a vehicle-body-secured lower bracket 4 as to be rockable (tiltable). The vehicle-body-secured lower bracket 4 is fixed to the vehicle body side, and includes a pair of horizontal portions 4a, 4a extending in the transversal direction of the steering column 1 and a pair of opposed flat plate portions 4b, 4b formed integrally with the pair of horizontal portions 4a, 4a, extending in the up-and-down directions, and also extending in the axial direction on both sides of the steering column. The pair of opposed flat plate portions 4b, 4b are formed with a pair of bracket support holes (second bracket holes) 4c, 4c.

The lower end portion, on the front side of the vehicle body, of the steering column 1 is provided with a support bracket portion (second support portion) 14 formed integrally with the swelling portion 7 by a swelling work. The support bracket portion 14 is formed integrally with a pair of flat side portions 14a, 14a so supported as to come into contact with the respective opposed flat plate portions 4b, 4b of the vehicle-body-secured lower bracket 4. These side portions 14a, 14a are formed with a pair of support holes 16, 16 defined as second support holes. As shown in FIG. 2C, the support bracket 14 which is opened downward is rotatably supported on the vehicle-body-secured bracket 4 in such a way that hinge pins 15, 15 are inserted through the support holes 16, 16 and the support holes 4c, 4c (see FIGS. 1A-1C). Each of the hinge pins 15 is inserted, with a washer 15a interposed, through the bracket support hole 4c and the support hole 16 of the side portion 14a of the support bracket 14, wherein one side end of the hinge pin 15 has an enlarged head portion directed outside, while the other end of the pin 15 is crushed to prevent its coming off. Thus, the tilt steering apparatus is constructed.

In the tilt adjusting type steering apparatus for the vehicle that employs the thus-constructed steering column 1, on the occasion of adjusting and thus fixing a tilt position, when rotating the operation lever 10 in a fastening direction, a gap between the head portion 11 of the fastening bolt 9 and the adjusting nut 9a is narrowed, and consequently a gap between the pair of opposed flat plate portions 5b, 5b of the vehicle-body-secured bracket 5 gets narrowed and press-fixed to the pair of side portions 7a, 7a of the swelling portion 7 of the steering column 1. With this contrivance, the tilt position of the steering column 1 is fixed.

On the other hand, when adjusting the tilt position, when rotating the operation lever 10 in a releasing direction, the gap between the head portion 11 of the fastening bolt 9 and the adjusting nut 9a is expanded, and consequently the gap between the pair of opposed flat plate portions 5b, 5b of the vehicle-body-secured bracket 5 returns to the previous level, and the press-fixation to the pair of side flat portions 7a, 7a of the swelling portion 7 of the steering column 1 is released. Through this operation, the steering column 1 gets rotatable about the hinge pin 15, and the tilt position of the steering column 1 can be adjusted. With the operation described above, the steering column 1 can be adjusted to a desired tilt position. The spring characteristic of the resilient member 3 is so designed that when adjusting the tilt position an auxiliary force acting upward is applied to the steering column 1 and can therefore assist (reduce) the operating force required when an operator moves the steering column 1 in the upward direction.

As shown in FIG. 2A, according to the first embodiment, the steel pipe material as the single blank is molded by the hydroform process into the steering column 1 including the swelling portion 7 and the support bracket portion 14 as the integral components, wherein the pair of side portions 7a, 7a of the swelling portion 7 are formed with the pair of column support holes 8, 8, and the pair of side portions 14a, 14a of the support bracket portion 14 are formed with the pair of bracket support holes 16, 16. The support bracket portion 14 is opened downward, as shown in FIG. 2C, from the front side end of the column to at least the lower portions of the bracket support holes 16, 16, thereby facilitating the rotation of the steering column.

Moreover, on the occasion of the integral molding of the swelling portion 7 with the steering column 1, the swelling portion 7 is molded on an area including peripheral edges of the pair of column support holes 8, 8 in such a way that there remain areas serving as protruded portions 20, 20 (which will hereinafter be referred to as flanges (flares)) protruding inward over the pair of column support holes 8, 8 as the whole.

Then, the pair of column support holes 8, 8 are bored while these flanges 20, 20 (flares) remain. A boring work method adopted in the first embodiment can involve employing a boring method by press working other than a complicated machining method such as milling, etc. These working methods are capable of sufficiently increasing surface rigidity (flexural rigidity) of the swelling portion 7.

The hydroform process given herein represents a method by which a die assembly accommodates a thin steel pipe, an interior of the steel pipe is filled with pressure water or an oil, and the steel pipe is swollen in a desired shape and thus molded, or represents, as a simple method, a method of swelling the steel pipe by filling it with a rubber and the like. The hydroform process is less of thermal deformation because of no welding portion and has more advantages of reducing costs for working and manufacturing and a weight as well than in the case of manufacturing a member taking the closed sectional structure by welding after the press molding.

Thus, according to the first embodiment, the swelling portion takes the closed sectional structure integral with the steering column 1, and it is therefore possible to make a compact design, attain excellent strength and rigidity, and reduce the manufacturing costs (a material cost, a working cost and assembling cost) and the weight as well.

Further, the flanges 20, 20 (flares) are formed along the peripheral edges of the pair of column support holes 8, 8, and hence the surface rigidity (flexural rigidity) of the swelling portion 7 integrally molded on the steering column 1 can be improved.

Accordingly, holding power of the steering column 1 with respect to the vehicle body can be enhanced by increasing the rigidity of the steering column 1 itself. This can lead further to improvement of the rigidity against vibrations.

Moreover, in the first embodiment, the flanges 20, 20 (flares) extend inwardly of the swelling portion 7, and it is therefore possible to avoid a problem of [molding flash] that might occur along the peripheries of the pair of column support holes 8, 8 on the occasion of the boring work.

Still further, it is feasible to smoothly make the tilt adjustment through the integral molding without any deformation caused when effecting weld-bonding as done by the conventional technique.

Second Embodiment

Next, a steering column for a vehicle according to a second embodiment of the present invention will hereinafter be described.

Figure 4A:
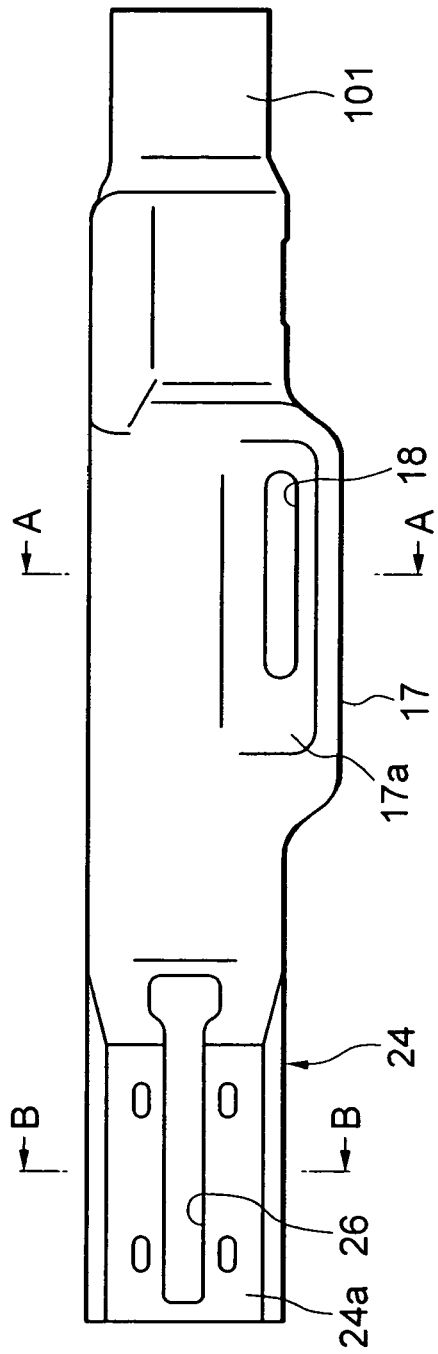
FIGS. 4A, 4B and 4C are views each showing a structure of only the steering column in FIGS. 3A, 3B and 3C.
Figure 4B:
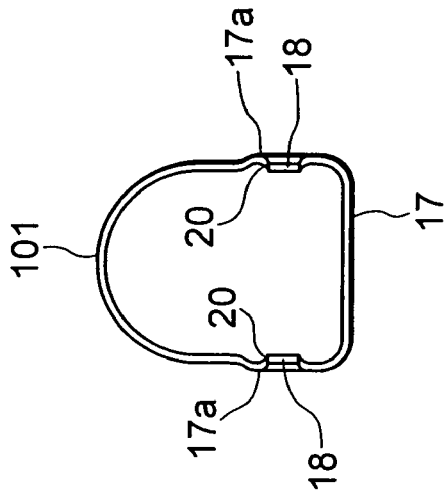
Figure 4C:
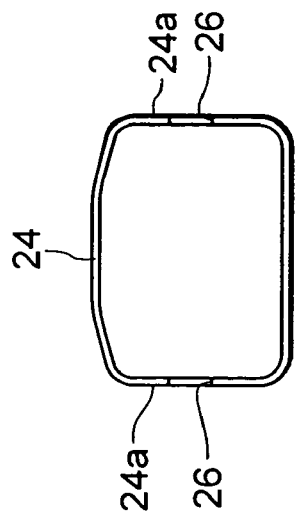

FIG. 3A is a side view showing the whole of a tilt/telescopic position adjusting type steering column apparatus for the vehicle according to the second embodiment of the present invention. FIG. 3B is a sectional view taken along the line A-A in FIG. 3A, as well as being a sectional view of a steering column, wherein a swelling portion of the tilt/telescopic type steering column apparatus for the vehicle according to the second embodiment of the present invention takes an integral closed sectional structure. FIG. 3C is a sectional view taken along the line B-B in FIG. 3A, as well as being a sectional view of the steering column, wherein a support bracket portion of the tilt/telescopic type steering column apparatus for the vehicle according to the second embodiment of the present invention takes an integral closed sectional structure. FIGS. 4A, 4B and 4C are views each showing a structure of only the steering column in FIGS. 3A, 3B and 3C.

Referring to FIGS. 3A-3C and FIGS. 4A-4C, the steering apparatus for the vehicle according to the second embodiment of the present invention includes a tilt/telescopic type steering column (which will hereinafter be simply termed a steering column) 101 for the vehicle, wherein a steering shaft 102 is rotatably supported within the steering column 101 through a bearing (unillustrated) provided along an inner peripheral portion of the steering column 101, and an unillustrated steering wheel is secured to an upper side end portion, on the rear side of the vehicle body, of the steering shaft 102. In the second embodiment, the steering column 101 is made of a steel pipe material as a single piece of blank by integral molding based on the same hydroform process as in the first embodiment in a way that integrally forms a swelling portion 17 at a middle portion of the steering column 101 and a support bracket portion 24 at a lower end portion, on the front side of the vehicle body, of the steering column 101. The support bracket portion 24 is, unlike the first embodiment, closed in its lower part at the front side end of the vehicle (see FIG. 3C).

To a central portion of the steering column 101 in a lengthwise direction, a resilient member 103 taking substantially an L-shape as viewed in FIG. 3A is fitted, thereby preventing the steering wheel from dropping down when releasing an operation lever 110. A vehicle-body-secured tilt bracket 105 is fixed to the vehicle body side, and includes a pair of horizontal portions 105a, 105a extending in a transversal direction of the steering column 101 and a pair of opposed flat plate portions 105b, 105b formed integrally with the pair of horizontal portions 105a, 105a, extending in up-and-down directions, and also extending in the axial direction on both sides of the steering column 101. The pair of opposed flat plate portions 105b, 105b are formed with a pair of tilt adjusting elongate holes 106, 106. The resilient member 103 taking substantially the L-shape is held by hooking hook portions 103a, 103a of the resilient member 103 on hooking portion 105c, 105c of the vehicle-body-secured tilt bracket 105. A lower portion 103b of the resilient member 103 abuts on a lower portion of the swelling portion 17 of the steering column 101. The resilient member 103 is provided with ring portions 103c, 103c given a spring characteristic for sustaining the steering column 101 upward with these ring portions 103c, 103c.

A pair of flat side portions 17a, 17a, which are so supported by the vehicle-body-secured tilt bracket 105 as to come into contact with the respective opposed flat plate portions 105b, 105b of the vehicle-body-secured tilt bracket 105, are integrally formed on the swelling portion 17 formed integrally with the steering column 101. These flat side portions 17a, 17a are formed with a pair of column telescopic position adjusting elongate holes 18, 18 serving as first support holes. A fastening bolt 109 having a clamp mechanism 118 is inserted through the pair of tilt adjusting elongate holes 106, 106 and the pair of column position adjusting elongate holes 18, 18, and an operation lever 110 is rotatably fitted on the fastening bolt 109. The clamp mechanism 118 can be constructed as a cam mechanism shown in FIGS. 3A-3C. A cam mechanism 109 includes a movable cam fitted on the fastening bolt 109 having a head portion and rotating together with the operation lever 110, a fixed cam 110b so fixed to the flat plate portion 105b as to be slidable but incapable of rotating, and a nut 110c screwed to a front side end of the bolt 109 outwardly of another flat plate portion 105b, and is a known mechanism in itself. The cam mechanism 109 can also serve as a stopper for the lever 110.

The lower end portion, on the front side of the vehicle body, of the steering column 101 is so supported on the vehicle-body-secured lower bracket 104 as to be rockable (tiltable). The vehicle-body-secured lower bracket 104 is fixed to a vehicle body side strengthening member (not shown), and includes a pair of horizontal portions 104a, 104a extending in transversal direction of the steering column 101 and a pair of opposed flat plate portions 104b, 104b formed integrally with the pair of horizontal portions 104a, 104a, extending in the up-and-down directions, and also extending in the axial direction on both sides of the steering column 101. The pair of opposed flat plate portions 104b, 104b are formed with a pair of bracket support holes 104c, 104c.

The lower end portion, on the front side of the vehicle body, of the steering column 101 is provided with a support bracket portion 24 formed integrally with the swelling portion 17 by the swelling work. The support bracket portion 24 is formed integrally with a pair of flat side portions 24a, 24a so supported as to come into contact with the respective opposed flat plate portions 104b, 104b of the vehicle-body-secured lower bracket 104. The side portions 24a, 24a are formed with a pair of bracket support elongate holes 26, 26 defined as second support holes for adjusting a column telescopic position. As shown in FIGS. 3A and 3C, the support bracket 24 is so supported on the vehicle-body-secured bracket 104 as to he slidable and rotatable in the way that the hinge pins 115 are, as shown in FIG. 3C, inserted through the bracket support elongate holes 26, 26 and the bracket support holes 104c, 104c. Each of the hinge pins 115 penetrates the elongate hole 26 of the side portion 24a via a Belleville spring 130 from an interior of the support bracket portion 24 with its enlarged head portion 115a directed inward and further penetrates the support hole 104c of the flat plate portion 104b of the vehicle-body-secured bracket 104, and is caulked (or clinched) outside by a flat plate portion 10b. Thus, the tile/telescopic type steering apparatus is constructed.

In the tilt/telescopic type steering apparatus for the vehicle that employs the thus-constructed steering column 101, on the occasion of adjusting and fixing the tilt or/and telescopic position(s), the operation lever 110 is rotated in the fastening direction, so that gap between the fixed cam 110b and the nut 110c is narrowed by the cam mechanism, and consequently a gap between the pair of the opposed flat plate portions 105b and 105b of the vehicle-body-secured tilt bracket 105 gets narrowed, with the result that the pair of side portions 17a, 17a of the swelling portion 17 of the steering column 101 are respectively press-fixed. Through this operation, the tilt or/and telescopic position(s) is fixed.

On the other hand, on the occasion of adjusting the tilt or/and the telescopic position(s), when the operation lever 110 is rotated in the releasing direction, the gap between the fixed cam 110b and the nut 110c is expanded by the cam mechanism, and the press-fixations between the pair of opposed flat plate portions 105b, 105b of the vehicle-body-secured tilt bracket 105 and the pair of side portions 17a, 17a of the swelling portion 17 are respectively released. With this operation, the tilt or/and telescopic position(s) of the steering column 101 can be adjusted. Through the operation described above, the steering column 101 can be adjusted to the desired tilt or/and telescopic position(s). A spring characteristic of the resilient member 103 is designed so that, when adjusting the tilt position, an auxiliary force acting upward is applied to the steering column 101 and can therefore assist (reduce) the operating force required when the operator moves the steering column 101 in the upward direction.

Note that the manufacturing method based on the hydroform process, the operations and the effects are the same as those in the first embodiment, and their in-depth descriptions are omitted.

Thus, in the second embodiment, the steering column 101 made of the steel pipe material as the single blank is integrally formed with the swelling portion 17 and the support bracket 24, and hence it is possible to enhance the holding power of the steering column 101 with respect to the vehicle body by increasing the rigidity of the steering column 101 itself and to reduce the manufacturing costs (the material cost, the working cost and the assembling cost) and the weight as well. To be specific, the conventional steering column requires fixing three pieces of components at the minimum such as a pipe, a distance bracket and a hinge bracket by welding, caulking (or clinching) and so forth, however, only the steel pipe material as the single blank suffices for the steering column 101 in the second embodiment.

Note that, as in the first embodiment, on the occasion of the integral molding of the swelling portion 17 with the steering column 101, the swelling portion 17 is molded on an area including peripheral edges of the pair of column support holes 18, 18 as the first support holes in such a way that there remain areas serving as protruded portions 20, 20 (which will hereinafter be referred to as flanges (flares)) protruding inward along the whole of the pair of column support holes 18, 18.

Thus, in the second embodiment also, as in the first embodiment, it is feasible to further improve the surface rigidity (flexural rigidity) of the swelling portion 17 integrally formed on the steering column 101 by forming the flanges 20, 20 (flares) over the peripheral edges of the pair of column adjusting elongate holes 18, 18. Moreover, the tilt and telescopic adjustments can be smoothly made through the integral molding without any deformation caused by the weld-bonding, etc. as by the conventional technique. Other operations and effects are the same as those in the first embodiment, and hence their explanations are omitted.

Third Embodiment

Figure 5:
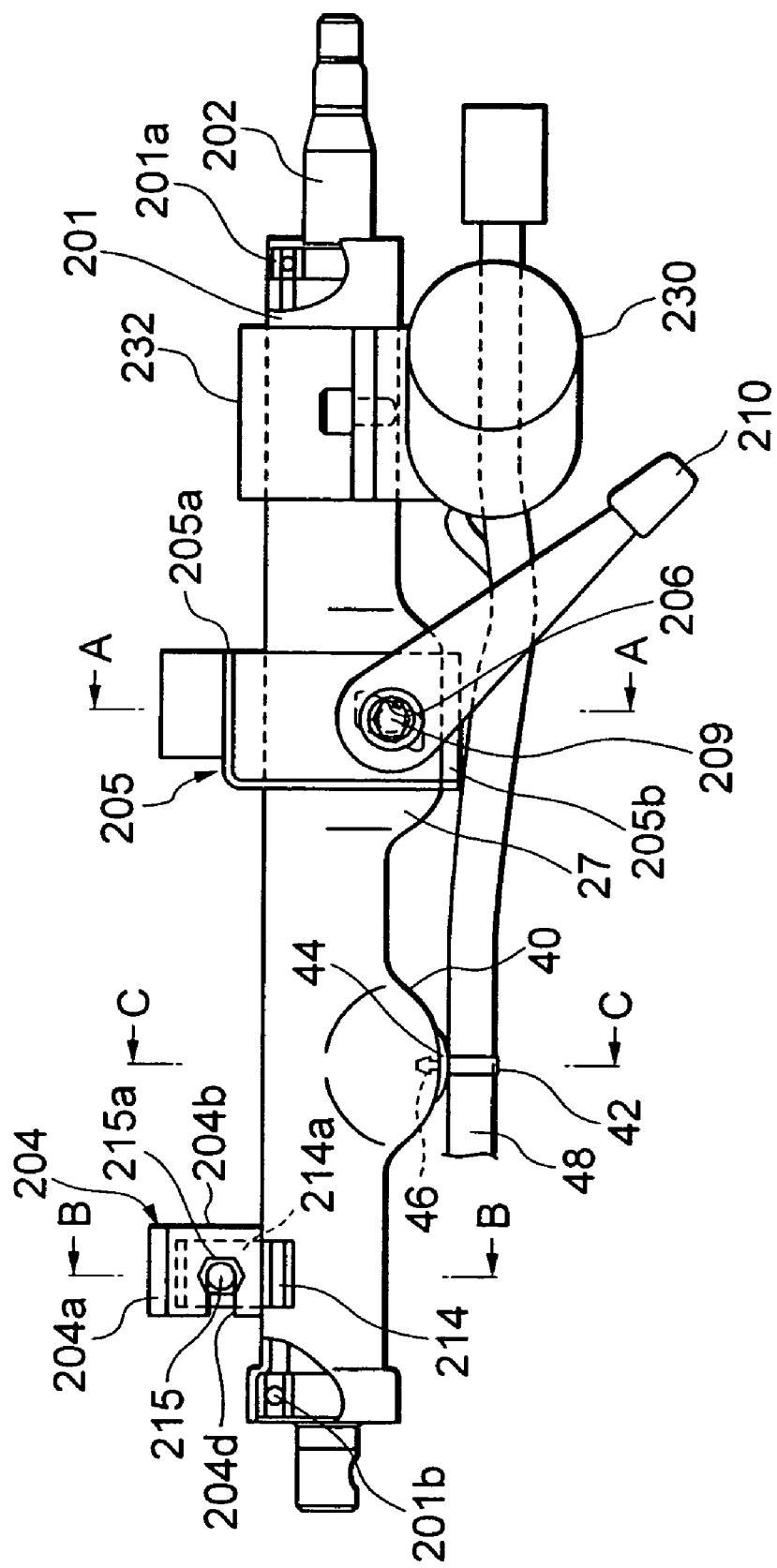
FIG. 5 is a side view showing the whole of a tilt adjusting type steering column apparatus for the vehicle according to a third embodiment of the present invention.
Figure 6A:
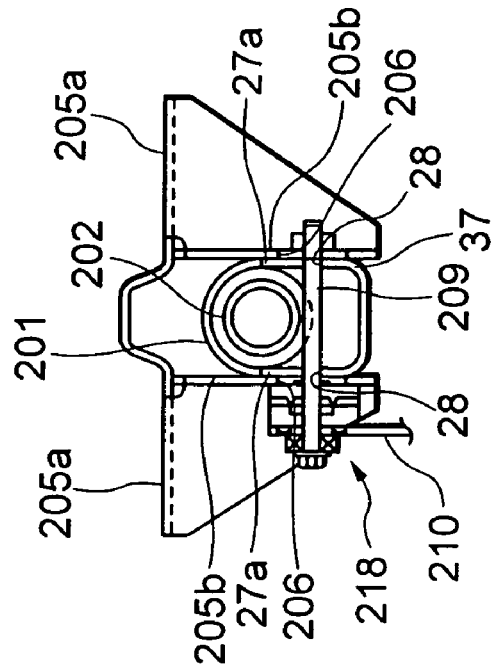
FIG. 6A is a sectional view taken along the line A-A in FIG. 5, as well as being a sectional view of a steering column, wherein a swelling portion of the tilt/telescopic adjusting type steering column apparatus for the vehicle according to the embodiment of the present invention takes an integral closed sectional structure.
Figure 6C:
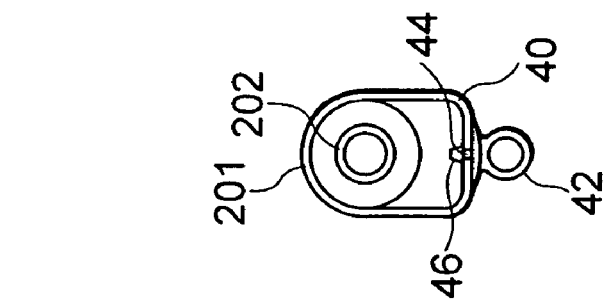
FIG. 6C is a sectional view taken along the line C-C in FIG. 5, as well as being a sectional view of a steering column, wherein a swelling portion for fixing a harness of the tilt adjusting type steering column apparatus for the vehicle according to the embodiment of the present invention takes an integral closed sectional structure.
Figure 6B:
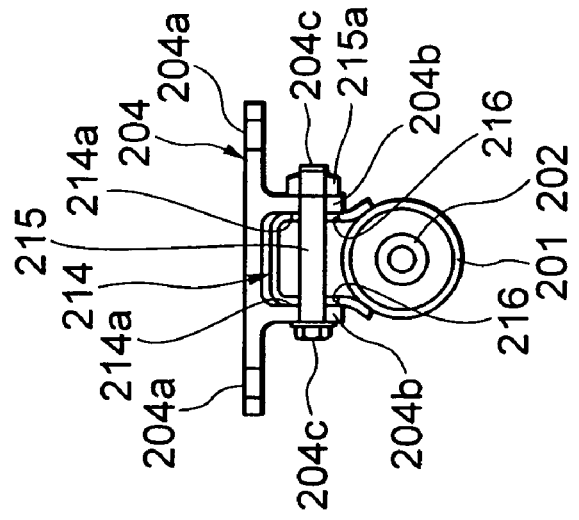
FIG. 6B is a sectional view taken along the line B-B in FIG. 5, as well as being a sectional view of a support bracket portion of the tilt/telescopic adjusting type steering column apparatus for the vehicle according to the embodiment of the present invention.

FIG. 5 is a side view showing the whole of a tilt type steering column apparatus for the vehicle according to a third embodiment of the present invention. FIG. 6A is a sectional view taken along the line A-A in FIG. 5, as well as being a sectional view of a steering column, wherein a swelling portion of the tilt/telescopic type steering column apparatus for the vehicle according to the third embodiment of the present invention takes an integral closed sectional structure. FIG. 6B is a sectional view taken along the line B-B in FIG. 5, as well as being a sectional view of a support bracket portion of the tilt/telescopic type steering column apparatus for the vehicle according to the third embodiment of the present invention. FIG. 6C is a sectional view taken along the line C-C in FIG. 5, as well as being a sectional view of a steering column, wherein a swelling portion for fixing a harness of the tilt type steering column apparatus for the vehicle according to the third embodiment of the present invention takes an integral closed sectional structure.

In the tilt type steering apparatus for the vehicle according to the third embodiment of the present invention, in FIG. 5, a cylinder holding member 232 for holding a key cylinder 230 is fitted to an outer peripheral portion of a steering column 201 at the upper end portion, on the rear side of the vehicle body, of the steering column 201.

A steering shaft 202 is rotatably supported within the steering column 201 via bearings 201a, 201b provided respectively on the upper end portion, on the rear side of the vehicle body, of the inner peripheral portion of the steering column 201 and on the lower end portion, on the front side of the vehicle body, of the inner peripheral portion thereof. An unillustrated steering wheel is secured to the upper end, on the rear side of the vehicle body, of the steering shaft 202.

A central portion of the steering column 201 in the lengthwise direction is so supported on a vehicle-body-secured tilt bracket 205 as to be rockable (tiltable). The vehicle-body-secured tilt bracket 205 is supported via resin capsules (not shown) on a vehicle body strengthening member so that the bracket 205 can get, upon a secondary collision, separated toward the front side of the vehicle from the vehicle body side strengthening member. The vehicle-body-secured tilt bracket 205 includes a pair of horizontal portions 205a, 205a extending in a transversal direction of the steering column 201 and a pair of opposed flat plate portions 205b, 205b formed integrally with the pair of horizontal portions 205a, 205a, extending in up-and-down directions, and also extending in an axial direction on both sides of the steering column 201. The pair of opposed flat plate portions 205b, 205b are formed with a pair of tilt adjusting elongate holes 206, 206 (see FIGS. 5 and 6A).

A swelling portion 27 is integrally formed by the hydroform process on a central portion of the steering column 201 in the lengthwise direction. The swelling portion 27 integrally formed on the steering column 201 is integrally formed with a pair of flat side portions 27a, 27a that are so supported on the vehicle-body-secured upper bracket 205 as to respectively come into contact with the opposed flat plate portions 205b, 205b of the vehicle-body-secured upper bracket 205. These side portions 27a, 27a are formed with a pair of column position adjusting round holes 28, 28 defined as first support holes. A fastening bolt 209 having a clamp mechanism 218 is inserted through the pair of tilt adjusting elongate holes 206, 206 and through the pair of column position adjusting round holes 28, 28. An operation lever 210 is rotatably fitted on the fastening bolt 209. The clamp mechanism 218 used herein, as in the second embodiment, includes a cam mechanism and is a known mechanism in itself.

A harness fixation swelling portion 40 defined as a third support member is formed when forming the swelling portion 27 in such a way that the swelling portion 40 is swollen downwardly of the steering column 201 between the swelling portion 27 of the steering column 201 and the lower end portion, on the front side of the vehicle body, of the steering column 201. The harness fixation swelling portion 40 is flat in its lower part, where a clip holding hole 44 is formed. A clip stopping portion 46 of a harness fixing clip 42 is inserted into this hole 44, and the harness fixing clip 42 is engaged with the steering column 201. A harness 48 that bundles wires leading to a wiper, a winker, a light, the key cylinder, etc. is inserted into the harness fixing clip 42 and fixed to the steering column 201.

The lower end portion, on the front side of the vehicle body, of the steering column 201 is so supported on the vehicle-body-secured lower bracket 204 as to be rockable (tiltable). The vehicle-body-secured lower bracket 204 is fixed to the vehicle body side and includes a pair of horizontal portions 204a, 204a extending in a transversal direction of the steering column 201 and a pair of opposed flat plate portions 204b, 204b formed integrally with the pair of horizontal portions 204a, 204a, extending in up-and-down directions, and also extending in an axial direction on both sides of the steering column 201. The pair of opposed flat plate portions 204b, 204b are formed with a pair of bracket support holes 204c, 204c. The bracket support holes 204c, 204c open forward and enable the steering column to move on the front side of the vehicle upon the secondary collision.

A support bracket 214 is joined by, e.g., welding, to the steering column 210 at the lower end portion, of the steering column 201. The support bracket portion 214 is formed with a pair of flat side portions 214a, 214a that are so supported as to respectively come into compact with the opposed flat plate portions 204b, 204b of the vehicle-boy-secured lower bracket 204. These side portions 214a, 214a are formed with a pair of round holes 216, 216 defined as second support holes for adjusting the column position. The support bracket 214 is rotatably supported on the vehicle-body-secured bracket 204 in such a way that a hinge bolt 215 is inserted through these round holes 216, 216 and the bracket support holes 204c, 204c and is secured by a nut 215a. Further, the bracket support holes 204c, 204c of the vehicle-body-secured lower bracket 204 have cut-away portions 204d, 204d formed toward the front side of the vehicle body, whereby when the secondary collision happens, the hinge bolt 215 inserted into the support bracket 214 welded to the steering column 201 comes off the bracket support holes 204c, 204c of the vehicle-body-secured bracket 204, and the steering column 201 is moved in the front direction of the vehicle body, thus enabling an impact caused upon the secondary collision to be relaxed. The tilt type steering apparatus is thus constructed.

In the thus-constructed tilt-type steering apparatus, the harness 48 that bundles the wires leading to the wiper, the winker, the light, the key cylinder, etc. is fixed via the harness fixing clip 42 to the steering column at the lower portion of the steering column 201, and hence it is possible to prevent, on the occasion of adjusting the tilt position, the wires from being disconnected and ill-connected without applying an unnecessary force to the wires even when rocking (tilting) the steering column 201.

The position in which to form the harness fixation swelling portion 40 is not limited to the illustrated example and may be either an upper-sided position or a lateral position of the steering column 201, depending on the specifications. The hydroform process based method of manufacturing the swelling portion 27 and the harness fixation swelling portion 40, the operations and effects related to the swelling portion 27, and the adjustment of the tilt position, are the same as those in the first embodiment, and hence their explanations are omitted.

As described above, in the third embodiment, the steering column 201 made of the steel pipe material as the single blank is integrally formed with the swelling portion 27 and the harness fixation swelling portion 40. It is therefore possible to reduce the manufacturing costs (the material cost, the working cost and the assembling cost) and the weight as well. To be specific, the conventional steering column requires fixing four pieces of components at the minimum such as a pipe, a distance bracket, a hinge bracket and a harness fixation bracket by welding, caulking (or clinching) and so forth, however, only two pieces of components such as the steel pipe material as the single blank and the hinge bracket 214 suffice for forming the steering column 201 in the third embodiment.

Fourth Embodiment

Figure 7:
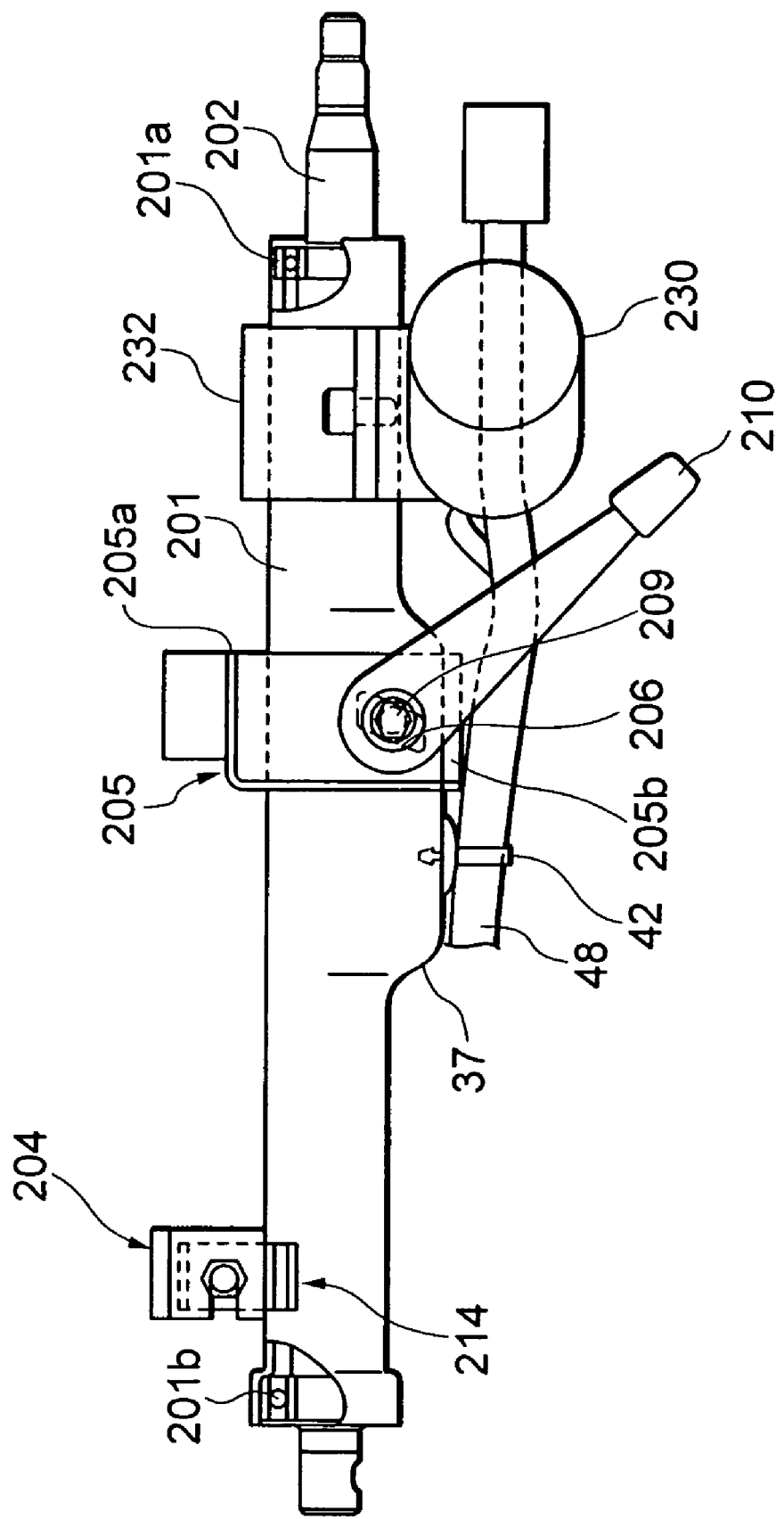
FIG. 7 shows a side view of a tilt adjusting type steering apparatus for a vehicle according to a fourth embodiment of the present invention.

FIG. 7 shows a side view of a tilt type steering apparatus for a vehicle according to a fourth embodiment of the present invention. A main difference of the fourth embodiment from the third embodiment is that the swelling portion 27 and the harness fixation swelling portion 40, which are formed in the different positions in the third embodiment, are formed as one swelling portion 37. Thus, the two swelling portions are united into one swelling portion 37, thereby facilitating a design of the die assembly for the steering column 201 and enabling the costs to be reduced. Further, a degree of difficulty of the working when in the hydroform process is also eased. Other operations and effects are the same as those in the third embodiment, wherein the same components are marked with the same numerals and symbols, and their explanations are omitted.

Fifth Embodiment

Figure 8:
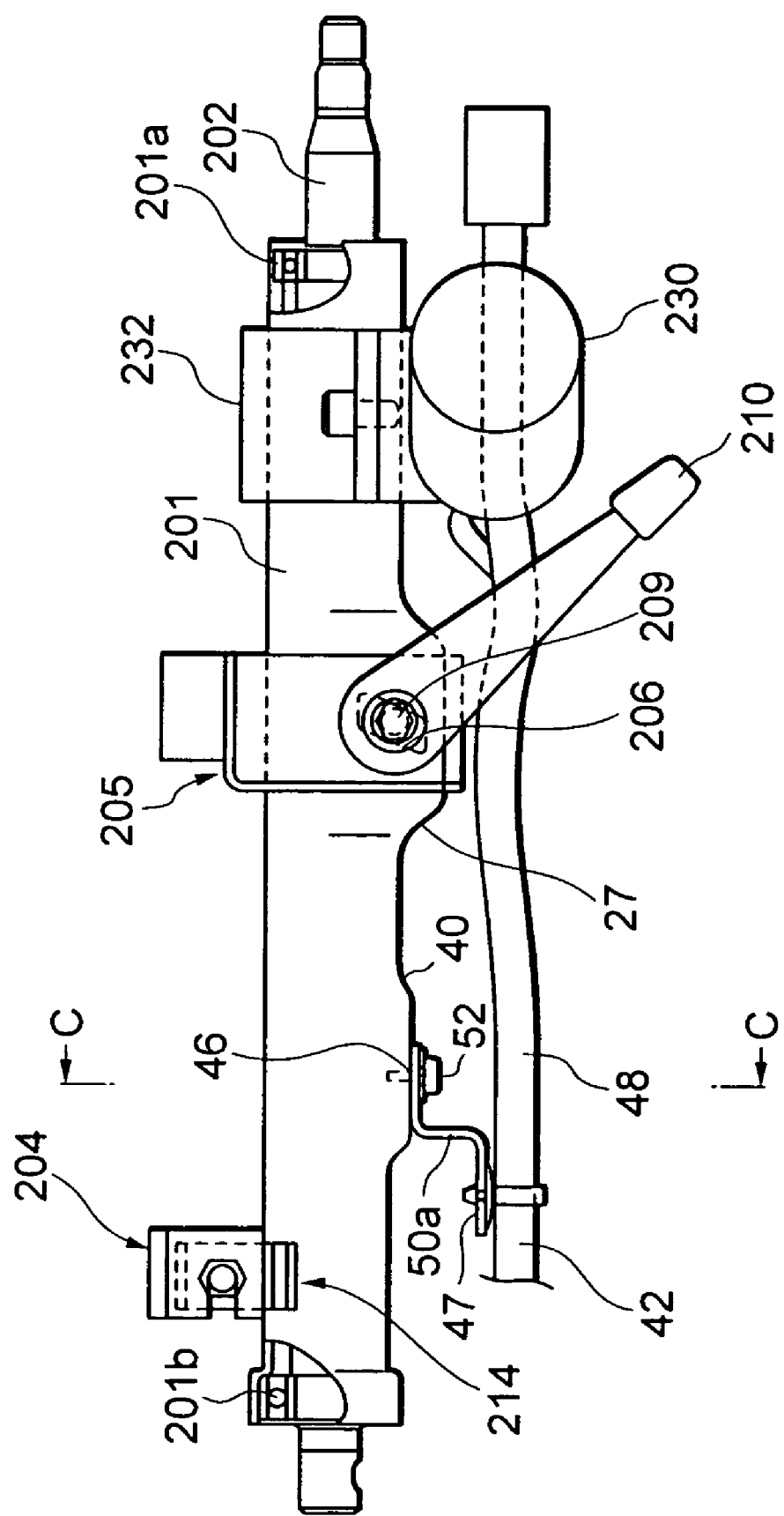
FIG. 8 shows a side view of the whole of a tilt adjusting type steering apparatus for a vehicle according to a fifth embodiment of the present invention.

FIG. 8 shows a side view of the whole of a tilt type steering apparatus for a vehicle according to a fifth embodiment of the present invention. FIG. 9A is a sectional view taken along the line C-C in FIG. 8, as well as being a sectional view of a steering column, wherein a swelling portion of the tilt type steering column apparatus for the vehicle according to the fifth embodiment of the present invention takes an integral closed sectional structure. FIGS. 9B-9E are sectional views of a steering column, wherein a swelling portion of the tilt type steering column apparatus for the vehicle with a harness fixed by use of pieces of metal fittings taking a variety of configurations, takes an integral closed sectional structure.

The following is a difference of the fifth embodiment from the third embodiment. As shown in FIGS. 8 and 9A, in the fifth embodiment, a harness fixation hook 42 for supporting a harness 48 is fixed by a fixing pin 52 to a harness fixation swelling portion 40 of the steering column 201 via a support metal fitting 50a taking substantially an S-shape in section. The support metal fitting 50a is formed with a hole 47 with which the harness fixation hook 42 engages. This contrivance can lessen bending (deflection) of the harness 48 from an axis line of the steering column 201, and hence the disconnection, etc. can be prevented without applying an unnecessary force to the wiring material within the harness 48.

FIG. 9B shows a case where a support metal fitting 50b assumes substantially an L-shape in section. This is an example in which the support metal fitting 50b is fixed by a fixing pin 52 to the steering column 201, and in FIG. 9B a harness fixation clip 42 is disposed on the right side of the steering column 201.

FIG. 9C shows an example where a clip stopping portion 46 is formed on the right side of the steering column 201, a support metal fitting 50c taking substantially an L-shape in section is fixed by a fixing pin 52 to the right side portion of the steering column 201, and the harness fixation clip 42 is disposed under the steering column 201 by use of the support metal fitting 50c.

FIG. 9D shows an example where the clip stopping portions 46, 46 are formed on both of the right and left sides of the steering column 201, a support metal fitting 50d taking substantially a U-shape in section is fixed by the fixing pins 52, 52 to both of the right and left sides of the steering column 201, and the harness fixation clip 42 is disposed under the steering column 201 by use of the support metal fitting 50d.

FIG. 9E shows an example where a pair of harness fixation swelling portions 40, 40 are formed on upper and lower portions of the steering column 201, a support metal fitting 50e taking substantially a U-shape in section is fixed by the fixing pins 52, 52 to both of the upper and lower sides of the steering column 201, and the harness fixation clip 42 is a disposed on the right side of the steering column 201 by use of the support metal fitting 50e. Thus, a degree of freedom of a circumferential layout of the harness 48 extending around the steering column 201 can be increased by variously changing the configuration of the support metal fitting.

Note that the fixing position and the fixing method of the harness 48 can be modified in a variety of forms without being limited to the examples given above.

Sixth Embodiment

FIG. 10A shows a side view of a tilt adjusting type steering column apparatus for a vehicle according to a sixth embodiment of the present invention. FIG. 10B is a sectional view taken along the line A-A in FIG. 10A, as well as being a sectional view of a steering column, wherein a swelling portion of the tilt type steering column apparatus for the vehicle according to the sixth embodiment of the present invention takes an integral closed sectional structure. FIG. 10C is a sectional view taken along the line B-B in FIG. 10A, as well as being a sectional view of a support bracket portion of the tilt type steering column apparatus for the vehicle according to the sixth embodiment of the present invention. FIG. 10D is a sectional views taken along the line C-C in FIG. 10A, as well as being a sectional view of a steering column, wherein a harness fixation swelling portion of the tilt adjusting type steering column apparatus for the vehicle according to the sixth embodiment of the present invention takes an integral closed sectional structure.

A difference of the sixth embodiment from the first embodiment and the third embodiment is that the steering column 1 made of a steel pipe material as a single blank, is integrally formed based on the hydroform process with the swelling portion 7 in the middle part in the lengthwise direction, the support bracket 14 at the lower end portion, on the front side of the vehicle body, of the steering column 1, and the harness fixation swelling portion 40 between the swelling portion 7 and the support bracket 14.

Note that the hydroform-process based manufacturing method of the swelling portion 7, the support bracket 14 and the harness fixation swelling portion 40, the operations, the effects and the tilt position adjustment are the same as those in the first embodiment and the third embodiment, wherein the same numerals and symbols are given, and their explanations are omitted.

As described above, according to the sixth embodiment, the steering column 1 made of the steel pipe material as the single blank is integrally formed with the swelling portion 7, the support bracket portion 14 and the harness fixation swelling portion 40, thereby making it possible to make a compact design, exhibit excellency of strength and rigidity and reduce the manufacturing costs (the material cost, the working cost, the assembling cost) and the weight as well. To be specific, the conventional steering column requires fixing four pieces of components at the minimum such as a pipe, a distance bracket, a hinge bracket and a harness fixation bracket by welding, caulking (or clinching) and so forth, however, only the steel pipe material as the single blank suffices for the steering column 1 in the sixth embodiment.

Note that all the embodiments according to the present invention have exemplified the case of manufacturing the steering column by the hydroform process, however, the steering column can be manufactured by use of, without being limited to the hydroform process, a rubber bulge molding method, an explosive forming method, a press molding method and so on.

Note that the present invention can be modified in a variety of forms without being limited to the embodiments discussed above. For instance, the swelling portion may be swollen toward the upper side of the steering column, and the fastening bolt may be inserted through upwardly of the steering shaft.

As discussed above, according to the present invention, it is feasible to provide the steering apparatus for the vehicle that is capable of increasing the rigidity of the steering column itself and decreasing the number of components.

What is claimed is:

1. In a steering apparatus for a vehicle, comprising:
    an upper bracket fixed to a rear side portion of a vehicle body and including a pair of opposed flat plate portions formed with first holes opposing each other and separated from each other;
    a lower bracket fixed to a front side portion of the vehicle body and including a pair of opposed flat plate portions formed with second holes opposing each other and separated from each other;
    a steering column rotatably supporting a steering shaft;
    a first support member held between said opposed flat plate portions of said upper bracket, formed with first support holes opposing to the first holes and supporting said steering column;
    a second support member held between said opposed flat plate portions of said lower bracket, formed with second support holes opposing the second holes and supporting said steering column;
    a third support member for supporting a harness member between said first support member and said second support member;
    a first support mechanism for supporting said steering column on said upper bracket via the first holes of said upper bracket and via the first support holes of said first support member; and
    a second support mechanism for supporting said steering column on said lower bracket via the second holes of said lower bracket and via the second support holes of said second support member,
    an improvement characterized in that said steering column is integrally formed with at least two said support members among said first support member, said second support member and said third support member,
    said first support member is integrally formed with a first swelling portion having a pair of side portions that respectively press-abut on said pair of opposed flat plate portions of said upper bracket,
    said second support member is integrally formed with a swelling portion having a pair of side portions supported respectively via a hinge device on said pair of opposed flat plate portions of said lower bracket, and
    said third support member is integrally formed with a third swelling portion having a third support hole for fixing a support member that supports said harness member.

2. A steering apparatus for a vehicle according to claim 1, wherein said third support member is formed on said first swelling portion, formed extending toward a front side of a vehicle body, of said first support member.

3. In a steering apparatus for a vehicle, comprising:
    an upper bracket fixed to a rear side portion of a vehicle body and including a pair of opposed flat plate portions formed with first holes opposed each other and separated from each other;
    a lower bracket fixed to a front side portion of the vehicle body and including a pair of opposed flat plate portions formed with second holes opposed each other and separated from each other;
    a steering column rotatably supporting a steering shaft;
    a first support member held between said opposed flat plate portions of said upper bracket, formed with first support holes opposing the first holes and supporting said steering column;

a second support member held between said opposed flat plate portions of said lower bracket, formed with second support holes opposing the second holes and supporting said steering column;

a first support mechanism for supporting said steering column on said upper bracket via the first holes of said upper bracket and via the first support holes of said first support member; and a second support mechanism for supporting said steering column on said lower bracket via the second holes of said lower bracket and via the second support holes of said second support member, an improvement characterized in that said steering column is integrally formed with said first support member and said second support member, said first support member is integrally formed with a first swelling portion having a pair of side portions that respectively press-abut on said pair of opposed flat plate portions of said upper bracket, and said second support member is integrally formed with a second swelling portion having a pair of side portions that respectively press-abut on said pair of opposed flat plate portions of said lower bracket, wherein a respective protruded portion protruding inward along the whole of each first support hole is formed along a peripheral edge of said first support hole.

4. A steering apparatus for a vehicle according to claim 2, wherein each first hole of said upper bracket is an elongate hole for adjusting a tilt position, said second support mechanism is a hinge mechanism for rotatably supporting said steering column, and said first support mechanism holds and fixes said first support member between said pair of opposed flat plate portions of said upper bracket, or releases said first support member to enable said steering column to move.

5. A steering apparatus for a vehicle according to claim 4, wherein the first support holes of said first support member and the second support holes of said second support member are elongate holes for adjusting a telescopic position of said steering column.

6. In a steering apparatus for a vehicle, comprising:

a steering column for rotatably supporting a steering shaft; and a vehicle-body-rear-side bracket and a vehicle-body-front-side bracket, fixed to a vehicle-body-side strengthening member, for supporting said steering column, an improvement characterized in that said steering column is integrally formed with a plurality of swelling portions and is supported on said vehicle-body-rear-side bracket and/or said vehicle-body-front-side bracket via said swelling portions, wherein a harness member supporting member is attached via one of said swelling portions.

7. A steering apparatus for a vehicle according to claim 1, wherein a respective protruded portion protruding inward along the whole of each first support hole is formed along a peripheral edge of said first support hole.

* * * * *